United States Patent [19]

Burkhart

[11] Patent Number: 4,459,844
[45] Date of Patent: Jul. 17, 1984

[54] GAS SEPARATION CHAMBER AND PORTABLE LEAK DETECTION SYSTEM

[75] Inventor: Christopher W. Burkhart, Los Altos, Calif.

[73] Assignee: Smith & Denison, Los Altos, Calif.

[21] Appl. No.: 389,234

[22] Filed: Jun. 17, 1982

[51] Int. Cl.³ .............................................. G01M 3/20
[52] U.S. Cl. ...................................................... 73/40.7
[58] Field of Search .................................. 73/40.7, 40

[56] References Cited

U.S. PATENT DOCUMENTS

| 3,239,996 | 3/1966 | Huffman | 55/16 |
| 3,837,228 | 9/1974 | Nemeth et al. | 73/40.7 |
| 3,867,631 | 2/1975 | Briggs et al. | 73/40.7 |
| 4,294,106 | 10/1981 | Gevaud et al. | 73/40.7 |

FOREIGN PATENT DOCUMENTS

| 2827537 | 10/1980 | Fed. Rep. of Germany | 73/40.7 |
| 56-02631 | 10/1981 | Japan | 73/40.7 |

Primary Examiner—Gerald Goldberg
Assistant Examiner—Hezron Williams
Attorney, Agent, or Firm—Poms, Smith, Lande & Rose

[57] ABSTRACT

A portable leak detector is disclosed for use with, say, helium as a tracer gas. The leak detector includes an improved separation chamber, an air pump for pumping the sample gas, a high vacuum spectrometer, and a small and lightweight evacuation pump. The separation chamber is formed by an air-tight enclosure which has an inlet duct, an outlet duct, and a tubular separation membrane extending between manifolds connected to the ducts. Gas samples are collected by a gas sampling probe and pumped by an air pump into the inlet duct of the separation chamber, through multiple parallel tubes of the tubular membrane material, and out the outlet duct of the separation chamber where it is exhausted. The multiple tubes are formed of a selectively-permeable membrane material such as Tefzel which permits the rapid diffusion of helium therethrough but which has relatively low permeability for other gases contained in the gas sample. During operation, the sample gas collected by the probe and contained within the tubular membrane would have a relatively high partial pressure, while the surrounding separation chamber and spectrometer connected therewith, which include the extracted tracer gas, are maintained at high levels of operational vacuum by the evacuation pump, so that the partial pressure of the tracer gas, such as helium is relatively low.

15 Claims, 5 Drawing Figures

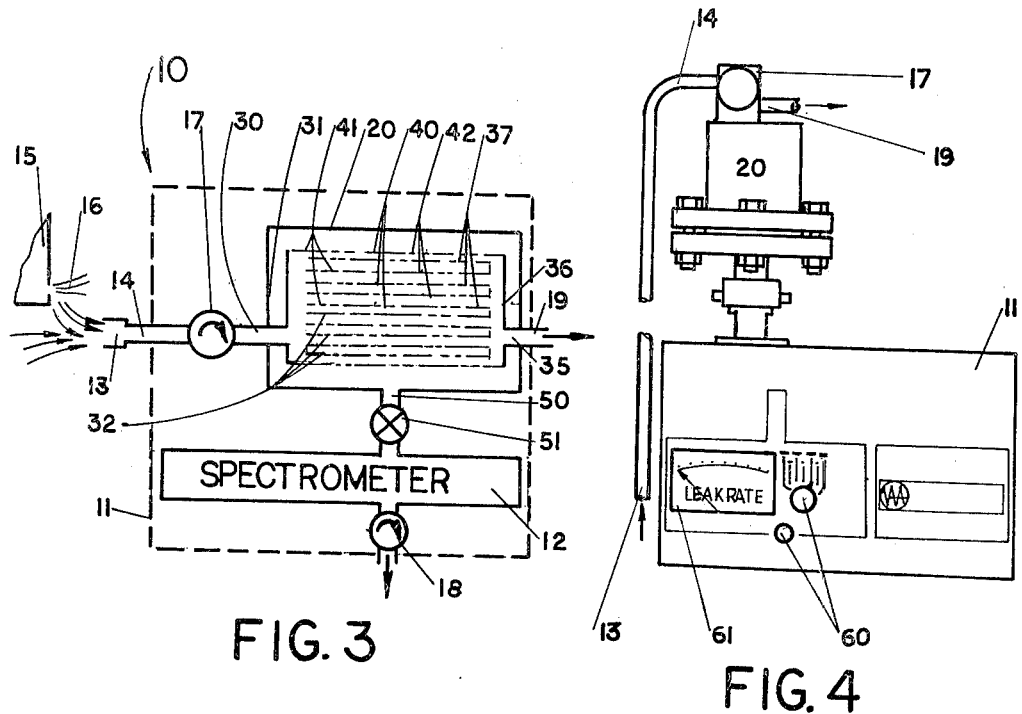
FIG. 3
FIG. 4
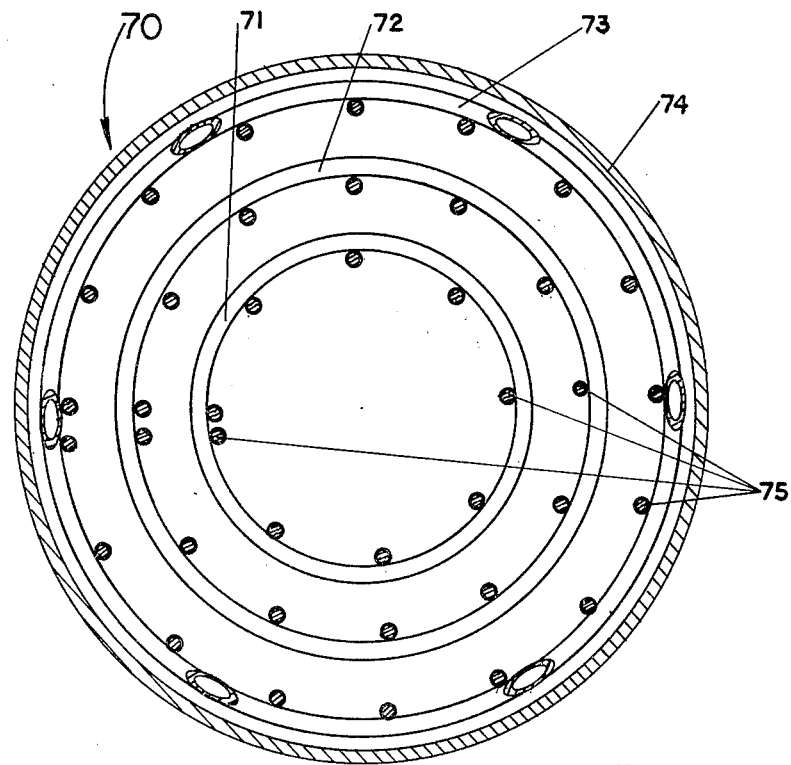
FIG. 5

GAS SEPARATION CHAMBER AND PORTABLE LEAK DETECTION SYSTEM

This invention relates generally to apparatus for the detection of leakage of a tracer gas. More specifically, this invention relates to a portable high sensitivity gas separation chamber in combination with a mass spectrometer for continuously analyzing gas samples to detect the presence and quantity of a tracer gas leaked from a container.

BACKGROUND OF THE INVENTION

Leak detectors are used in the manufacture and maintenance of containers or vessels which are used to contain gases or liquids, or for checking for leaks in systems which are supposed to be hermetically sealed. Extremely small leaks may develop in a container during its manufacture or at some point during its useful life. Such leaks can render the container or vessel ineffective for its intended use and can cause extensive damage to the goods or materials stored therein or protected thereby. Accordingly, leak detectors have been used to detect the presence of small leaks in containers so that they may be repaired or replaced prior to causing damage to or loss of their contents.

In general, leaks are detected by placing either the interior or the exterior of the container to be tested in an environment containing high concentrations of an easily diffused tracer gas. A partial pressure gradient is applied to the container walls in the direction of the desired diffusion and the other side of the container wall is analyzed for the emergence of the tracer gas as a result of its passage or diffusion through a leak in the container.

Helium is a preferred tracer gas due to its inert qualities and small molecular structure which permits it to be easily and rapidly detected and extracted from a gas sample by a semi-permeable membrane such as that disclosed in U.S. Pat. No. 3,239,996 (Huffman).

In order to detect very small leaks, a sensitive mass spectrometer is typically used to detect the leakage of a tracer gas in accordance with one of three methods. In the first method, the container of enclosure itself is evacuated, connected to the mass spectrometer and is surrounded with the tracer gas. If a leak is present, the tracer gas will pass through the leak in the wall of the container into its evacuated interior and to the mass spectrometer where the existence (but not location) of the leak is detected.

According to the second method, the container is filled and pressurized with the tracer gas while placed in an evacuated chamber which is connected to the mass spectrometer.

Detecting leaks by either of these two methods has severe disadvantages, particularly if the container or vessel being tested is large or has been previously installed for use. With the first method, the time necessary to completely evacuate a large container may be prohibitive and would require extensive vacuum pumping equipment. Further, for some applications in which the container to be tested is installed in a position of use, it could be either difficult or impossible to surround that chamber with an environment having a high and uniform concentration of the tracer gas. The second method may only be employed with containers that may be separated from their installation of use and are small enough to fit within an evacuation chamber.

The third method eliminates the requirement of either evacuating the interior of the container to be tested or placing that container within an evacuated environment. The third method involves sampling at atmospheric pressure. By this method, the container to be tested is filled and pressurized with the tracer gas and a special probe apparatus is used in conjunction with the mass spectrometer to sample gas at atmospheric pressure from specific locations about the periphery of the container. Since a mass spectrometer must operate in a vacuum in order for the filament to not be burned up, probe apparatus used with the third method have typically provided some apparatus for restricting flow from the sampling site at atmospheric pressure into the spectrometer's vacuum system. These flow restrictors have included combinations of a tiny aperture with careful throttling, or the use of fine capillary tubing.

Since the sampled gas is being emitted into the mass spectrometer at atmospheric pressure through small apertures, the mass spectrometer must operate at less than the level of vacuum attainable with either of the first two methods. Operating at a lesser level of vacuum reduces operating life by causing the filament to burn out more rapidly. Further, this sampling technique greatly reduces instrument sensitivity since the tracer gas constitutes only a small proportion of the sampled gas taken from the environment proximate a container with a small leak, and only a very small sample of that gas may be taken into the spectrometer for analysis in order to retain at least minimum levels of operating vacuum within the mass spectrometer. In this apparatus, the size of sample emitted into the spectrometer for analysis, and thus the sensitivity of the apparatus, has an inverse effect on the life of the spectrometer.

While leak detectors thus described and used in accordance with the third method are capable of testing containers which are already installed in a position of use, such as an underground gasoline tank at an automobile service station, such devices are not very portable for use on location due to the requirement of having continuously running high-volume roughing pumps which maintain an acceptable level of vacuum within the mass spectrometer. Further, the use of a roughing pump may cause contamination of the mass spectrometer due to pump oil outgassing, and further sensitivity is lost since the pump must quickly exhaust most of the inlet sample. In view of this factor, only a very small fraction of the gas sample ever undergoes analysis in the mass spectrometer and thus proportionately small leaks are unable to be detected.

U.S. Pat. No. 3,837,228 (Nemeth, et al.) teaches the use of a semi-permeable plastic film on the sampling end of a probe having relatively high permeability for the tracer gas thereby permitting analysis of higher concentrations of the tracer gas with reduced backgroung noise due to the presence of other gases in the sample. The disclosed apparatus does not contemplate the use of high pressure gradients across the plastic film and thus does not disclose structure sufficient to handle such gradients without damage to the film. Because of this, the gas received from the probe must also be throttled through a small aperture or capillary tubes, as above, and, consequently, this apparatus requires a large capacity roughing pump and provides only moderate improvement in senstivity. In addition, the amount of surface area of the plastic film necessary to pass tracer gas (at slower rates due to the low pressure differential) sufficient to be detectable by the spectrometer is so large that the detector using a sheet of plastic film cannot be made very portable. If a high vacuum is provided on one side of the plastic film and atmospheric pressure on the other to increase the rate of diffusion, 100 square inch sheet of film would require a support structure able to carry 1470 pounds. Also, in a sheet-type construction, some portions of the sheet must be large distances away from the mass spectrometer causing slow response speeds.

Accordingly, it is an important object of the present invention to avoid the need for massive and expensive roughing pumps. It is a further object to provide a gas sampling apparatus in accordance with the third method which has increased sensitivity for detecting the tracer gas and eliminates the need to throttle sample gas through an aperture. It is another object to provide a gas sampling apparatus of small size adapted to extract high volumes of substantially pure tracer gas from a continuously flowing gas sample. It is yet another object to disclose a gas sampling membrane structure adapted to operate under high pressure gradients, approaching one atmosphere. It is yet a further object of the present invention to disclose and provide a portable gas sampling apparatus for detecting leaks which may analyze larger gas samples while operating at relatively higher levels of vacuum, thereby improving both the sensitivity of the detector and the useful life of the filament within the portable mass spectrometer. Finally, it is an object of the present invention to disclose and provide a gas separation apparatus for extracting from a continuously flowing gas sample nearly pure concentrations of a tracer gas for analysis by a mass spectrometer while greatly reducing the relative concentration of other gases contained in the atmospheric gas sample.

SUMMARY OF THE INVENTION

Simply stated, the present invention comprises a separation chamber for extracting relatively pure tracer gas from gas samples collected by a gas sampling probe at atmospheric pressure. The separation chamber forms an air-tight sealed chamber which is coupled to a mass spectrometer, the chamber being evacuated to high levels of vacuum by an evacuation pump associated with the mass spectrometer. An inlet duct passes through a wall of the separation chamber and is externally connected to a gas sampling probe. An outlet duct similarly passes through a wall of the separation chamber. A tubular selectively-permeable membrane contained within the separation chamber connects the inlet duct to the outlet duct such that gas collected by the gas sampling probe passes through the inlet duct, travels through the tubular selectively-permeable membrane, and is exhausted out of the separation chamber through said outlet duct. The selectively-permeable membrane selectively permits the tracer gas contained within the gas sample to pass through the walls of the membrane into the separation chamber and thus to the mass spectrometer where it is detected. The bulk of the remaining gases of the gas sample are channeled by the selectively-permeable membrane to the outlet duct where they are exhausted, with only very small quantities of the larger molecules of the other gases passing through the tubular membrane. In this manner, only a substantially pure sample of tracer gas passes into the separation chamber and, thereby, into the mass spectrometer while a high level of vacuum is maintained in the separation chamber and spectrometer apparatus.

In a more specific aspect, the present invention involves a portable leak detector which includes a portable housing, a mass spectrometer mounted to said housing and adapted for detecting quantities of helium, a tracer gas used to identify leaks. The mass spectrometer may include a diffusion type evacuation pump for maintaining the spectrometer apparatus at high levels of vacuum. A separation chamber is mounted in the housing and coupled to the spectrometer so that the spectrometer evacuation pump also maintains the separation chamber at a high level of vacuum. A gas sampling probe is provided which has a flexible hose extending external of the housing for continuously collecting gas samples at specific locations in the vicinity of possible leaks. The flexible hose of the probe passes into the housing and is connected to a small pump which causes a continuous air flow within the flexible hose thereby causing continuous collection of gas samples by the gas sampling probe. Gas samples exiting the pump enter an inlet duct which passes through a wall of the separation chamber thereby delivering the sample gas to the separation chamber. An exhaust duct passes through a wall of the separation chamber for exhausting unused sample gas from the separation chamber to the environment. A tubular separation membrane is mounted within the separation chamber having one end connected to the inlet duct and the other end connected to the outlet duct such that sample gas is normally channeled from the inlet duct through the tubular membrane to the outlet duct where it is exhausted. The tubular separation membrane is comprised of a selectively-permeable material which permits a predetermined tracer gas, helium, to diffuse through the membrane into the separation chamber in response to the partial pressure gradient of the helium included in the gases within the tube and the vacuum within the separation chamber. Substantially pure quantities of tracer gas are then channeled from the separation chamber into the mass spectrometer for detection.

In order to maximize the surface area of the membrane while maintaining its structural integrity in view of the pressure gradient across the membrane, the inlet duct, the outlet duct and the tubular membrane may be configured to form multiple tubes connected in parallel and each arranged in a helix about a substantially cylindrical wire frame contained within the separation chamber. It is contemplated that more than one of the multiple helix structures may be nested within one another within the separation chamber to further increase surface area of the membrane without increasing the time rate of travel of the gas sample from the inlet duct to the outlet duct or from the membrane to the spectrometer, thereby further increasing the sensitivity and responsiveness of the leak detector.

The present invention, accordingly, has a number of advantages. The ability to collect a gas sample at atmospheric pressure while maintaining the mass spectrometer at high levels of vacuum eliminates the need for extensive vacuum pump capability. Generally, a roughing pump weighs as much as the mass spectrometer itself and is twice as cumbersome. With the apparatus of the present invention a small capacity evacuation pump suffices to maintain the high level of vacuum needed to support the diffusion pump. No roughing pump or liquid nitrogen trap is needed.

Another advantage of the present invention is the increased sensitivity and minimized contamination afforded by the tubular membrane operating under a pressure gradient. The tubular membrane connecting the inlet duct to the outlet duct prevents the passage of contaminants into the separation chamber and to the mass spectrometer and, further, permits the spectrometer to operate at high levels of vacuum, thereby providing increased useful life for the spectrometer filament. The membrane increases sensitivity by filtering out most of the gases contained in the environment except for the intended tracer gas, helium. The tubular membrane further increases sensitivity by allowing the entire inlet gas sample to be analyzed due to the extended-length pathway through the tubular membrane, and the relatively high permeability of the membrane to the tracer gas, thereby allowing much of the tracer gas contained within the inlet sample to pass through the membrane to the mass spectrometer. In the same manner, sensitivity is increased by allowing a greater volume of gas to be sampled and analyzed per unit of time since no flow restricting orifice or aperture is necessary. Finally, due to the compact construction and higher level of operating vacuum, responsiveness is increased by decreasing the time lag between collection of the gas sample by the gas sampling probe, its analysis in the mass spectrometer, and its evacuation from the leak detecting apparatus.

Yet a further advantage is afforded by the geometry of the selectively-permeable membrane within the separation chamber. Fabrication of the membrane in the shape of an extended-length tube maximizes the surface area of the membrane relative to the volume of gas contained within the tube. Second, the tubular shape provides a stable structure for handling a pressure differential across the membrane wall without producing regions or areas which are prone to leakage or structural failure. Finally, the tubular shape permits an extended length of tube and thus an extended surface area of membrane to be wound in a helix shape within a small evacuated cylindrical chamber thereby increasing the flow rates of the tracer gas from the tube to the spectrometer and minimizing the time lag between sample collection by the gas sampling probe and detection in the mass spectrometer.

It is also noted that some instruments have dead spaces of turbulent gas flow so that some of the tracer gas may be delayed from the time it is picked up, until it appears as a reading on the detector. This phenomenon causes what is sometimes referred to as a "virtual leak", when there is no actual tracer gas being picked up at the probe. The straight-through gas flow of the present invention avoids this undesired problem.

These and other advantages of the present invention will become evident to one skilled in the art upon a consideration of the following detailed description when taken in combination with the accompanying drawings, as follows.

BRIEF DESCRIPTION OF THE DRAWINGS

FIG. 3 is a diagramatic representation of the portable leak detector apparatus of the present invention;

FIG. 4 is front view of the portable leak detector of the present invention; and FIG. 5 is an enlarged top view similar to FIG. 2 of an alternative embodiment of the apparatus of FIG. 1, taken in section along plane II—II of FIG. 1.

DETAILED DESCRIPTION OF AN EXEMPLARY EMBODIMENT

Figure 1:
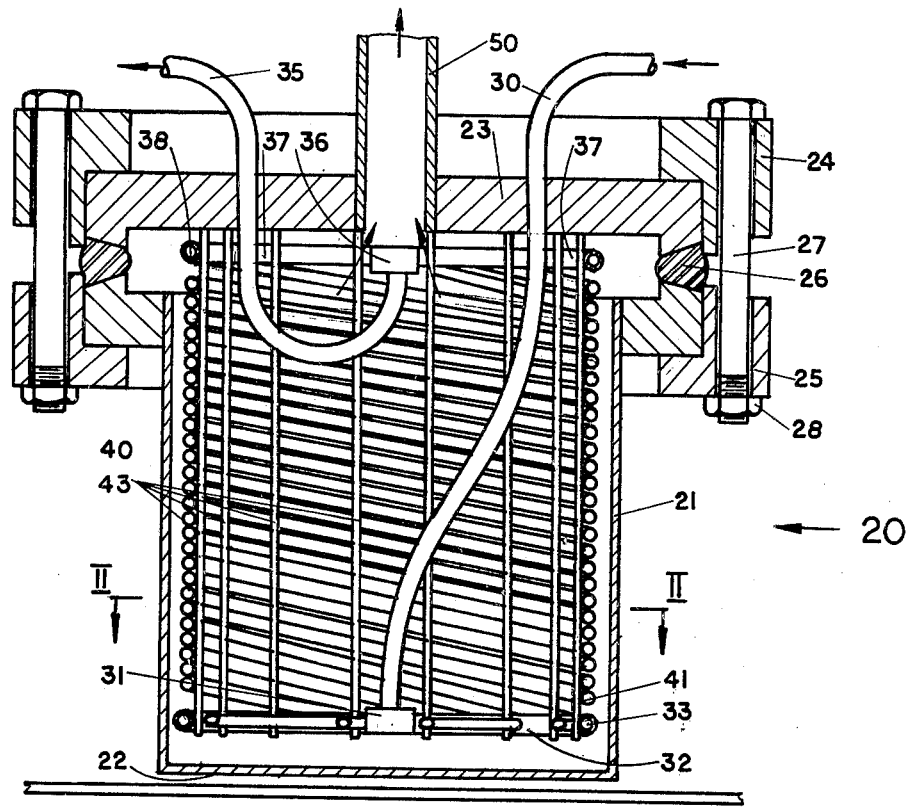
FIG. 1 is a cross-sectional view of a cylindrical separation chamber illustrating the principles of the present invention taken through the central axis of the chamber.

Referring initially to FIG. 3, a portable leak detector 10 is shown diagramatically. The leak detector includes a housing 11 which contains a mass spectrometer 12 for measuring the quantity of a predetermined tracer gas in a gas sample provided to the spectrometer. A gas sampling probe 13 is connected to the portable leak detector 10 by a flexible hose 14.

The gas sampling probe 13 is configured to collect gas samples for analysis by the portable leak detector 10. In this manner, a leak 16 in a container 15 filled with a predetermined tracer gas, preferably helium, can be detected by positioning the probe 13 near the leak 16 such that some of the tracer gas passing through leak 16 is included within the gas sample collected by gas sampling probe 13. It is noteworthy that probe 13 does not include any flow restrictors, orifices, throttles, or capillary tubes. The probe 13 may include a screen or filter for filtering out dust or other contaminant solids in air suspension.

A small air pump 17 maintains a constant flow of sample gas picked up by sampling probe 13 through the portable leak detector such that the presence of tracer gas may be rapidly detected. Gas collected by the sampling probe 13 passes through flexible hose 14 and housing 11 into air pump 17 which discharges the gas sample into a separation chamber 20.

Within the separation chamber 20, tracer gas is extracted from the gas sample and is channeled under high vacuum through the optional isolation valve 51 into the spectrometer 12 and is then evacuated from the leak detector by evacuation pump 18 associated with spectrometer 12. The remaining sample gas is exhausted from the separation chamber 20 through exhaust 19.

Figure 2:
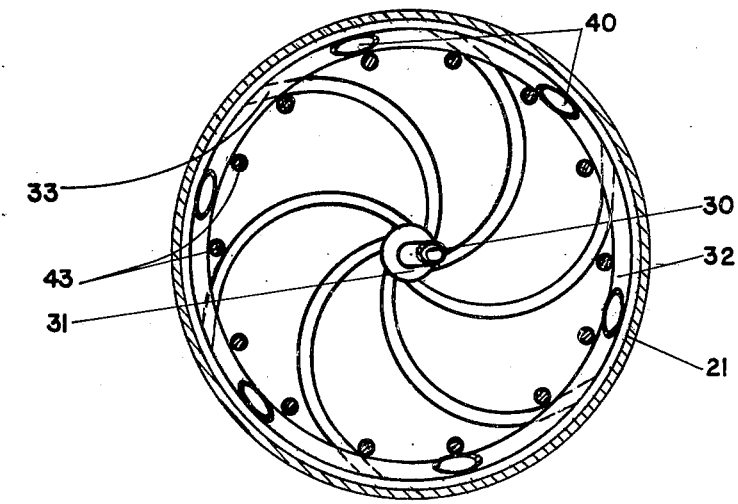
FIG. 2 is a top elevation view of the apparatus of FIG. 1 taken in section along plane II—II of FIG. 1.

Turning to FIGS. 1 and 2, the separation chamber 20 more specifically comprises, in the preferred embodiment, a chamber having a cylindrical side wall 21, a base 22 integral with said side wall, and a detachable lid 23. The entire separation chamber 20 sits upon, and is mounted by, leak detector housing 11. The detachable lid 23 may be attached and sealed to the cylindrical side wall 21 of the separation chamber 20 by means of a top flange 24 attached to lid 23, a bottom flange 25 which engages the annular ring 21' hermetically sealed and attached to the side wall 21, an annular gasket 26 positioned therebetween, and multiple bolts 27 and nuts 28 for fastening said top flange 24 to said bottom flange 25. By this construction, a sealed air-tight cavity is formed by said separation chamber.

Passing through lid 23 of separation chamber 20 is an inlet duct 30, an outlet duct 35, and a spectrometer coupling 50. More specifically, inlet duct receives sample gas collected by gas sampling probe 13, channeled by flexible hose 14, and pumped by air pump 17 and passes that gas through lid 23 into the interior of separation chamber 20. Outlet duct 35 receives gas from tubes 40, and after the sample has been processed in a manner which will be more fully described, passes that gas through lid 23, and out exhaust 19 to return said sample gas to the environment.

The sample gas is channeled within separation chamber 20 from the inlet duct 30 to the outlet duct 35 by a combination of manifolds and tubular membranes. In the preferred embodiment, the portion of inlet duct 30 interior of separation chamber 20 is connected to an inlet manifold 31 which channels the sample gas into multiple manifold tubes 32. Each of the manifold tubes 32 has one end connected to the inlet manifold 31 where it receives the sample gas and has the other end 33 connected to a tubular membrane 40.

Tubular membrane 40 is comprised of a selectively-permeable material which permits greater diffusion of a predetermined gas, the tracer gas, with respect to other gases present, through the walls of said tubular membrane 40 into the separation chamber 20. Nearly all of the gases of the sample gas, which do not readily diffuse through membrane 40 are delivered to the end 38 of a respective manifold tube 37 of outlet manifold 36 which is in turn connected to outlet duct 35.

In this manner, sample gas supplied by air pump 17 is continuously channeled into the separation chamber 20 by inlet duct 30 into inlet manifold 31, multiple manifold tubes 32, respective tubular membranes 40, respective outlet manifold tubes 37, outlet manifold 36, and out through outlet duct 35 where it is exhausted at exhaust 19. Tracer gas contained within the sample gas is exposed to the extended surface area of the multiple tubular membranes 40 and readily diffuses through the walls of the tubes 40 into the separation chamber 20. Any tracer gas thereby extracted from the sample gas passes through spectrometer coupling 50 through isolation valve 51 (shown in FIG. 3) to spectrometer 12 for analysis.

In an optimum design, the surface area of the tubular membrane 40 is maximized while the time of flow from the inlet duct 30 to the outlet duct 35 is minimized by minimizing the volume of sample gas contained between the inlet duct 30 and the outlet duct 35 and by minimizing frictional resistance to flow, particularly turbulence.

In the preferred embodiment, an optimum configuration of tubular membranes 40 is formed by providing an inlet manifold 31 which divides the flow through inlet duct 30 into six manifold tubes 32. The end 33 of each of these manifold tubes is connected to the inlet end 41 of a respective one of six selectively-permeable membrane tubes 40. The outlet end 42 of each of the membrane tubes 40 is connected to the end 38 of a respective one of six manifold tubes 37 which combine at outlet manifold 36 to deliver the analyzed sample gas, less much of the extracted tracer gas, to outlet duct 35.

The six tubular membranes 40 are connected in parallel by the manifolds and are arranged within the separation chamber 20 in mutually coaxial helixes about a frame of multiple wire posts 43 which are arranged substantially in a cylinder. This construction further allows the multiple membrane tubes 40 to be positioned within the separation chamber 20 in a manner by which the volume of separation chamber 20 may be minimized, thereby reducing the lag time between the extraction of the tracer gas from the sample gas in separation chamber 20 and the time when that extracted tracer gas channeled by spectrometer coupling 50 is detected by spectrometer 12 and then purged from the system by evacuation pump 18.

Returning to FIG. 3, the improved separation chamber 20 is thus diagrammatically shown as including an inlet manifold 31 which separates the inlet flow into six parallel paths. Each of the parallel flows passes inside a selectively-permeable tubular membrane 40 such that tracer gas may pass through the membrane into the separation chamber 20. All gases in the sample which do not diffuse through the membrane are again collected by outlet manifold 36 and exhausted through exhaust 19. A pressure differential across the membrance wall from slightly above atmospheric pressure as a result of air pump 17 to a high level of vacuum as a result of evacuation pump 18 further assists in the extraction of purified tracer gas from the sample gas. That purified tracer gas which has been separated from the air sample passing through the tubular membranes is delivered through isolation valve 51 into the spectrometer 12 and then purged from the system by evacuation pump 18.

As may be seen in FIG. 4, the separation chamber 20 and pump 17 may be mounted on the top of the housing 11 which is provided with external controls 60 and a meter 61 or other visual or aural indicator for indicating presence and quantity of the predetermined tracer gas in the proximity of the probe 13. The housing 11 may for example be an instrument sold by Varian Company as its unit type No. 936-40. It is desirable for meter 61 to include a tone generator having either the pitch or volume of the tone generated thereby varying in response to the quantity of tracer gas being extracted from the sample gas and detected.

Due to the isolation of the separation chamber 20 and spectrometer 12 at a high level of vacuum from other gases of the sample gas at atmospheric pressure by tubular membrane 40, the necessity for a large and bulky pump is eliminated and an operating vacuum for the spectrometer may be maintained by small and lightweight evacuation pump 18 supporting the diffusion pump within the spectrometer.

In an alternative embodiment which is shown by FIG. 5, the surface area of the tubular membrane 40 may be increased without increasing the time response of the spectrometer detector, thereby increasing its sensitivity, by the provision of multiple nested tubular membrane assemblies. Alternate membrane construction 70 is comprised of a first membrane helix 71, a second membrane helix 72 and a third membrane helix 73, each comprising six tubular membranes connected between inlet and outlet manifolds similar to the construction of FIG. 2. Each of these nested membranes is contained within the cylindrical chamber, particularly chamber wall 74, and are each supported by a substantially cylindrical frame comprising wire posts 75.

In both the preferred and alternatives embodiments, the frame formed by multiple wire posts 43 or 75 are chromed to form a corrosion-resistant inert surface for mounting the multiple tubular membranes 40. The separation chamber 20 is, in turn, formed of stainless steel. Finally, flexible hose 14 may be formed of any relatively inert material since the sample gas contained and channeled therein is channeled at substantially atmospheric pressure and so diffusion through the walls of hose 14 is insignificant.

It has been found that when helium is used as the tracer gas, an optimum material for use for the tubular membranes is Tefzel, E.I. DuPont deNemours Chemical Corporation's trade name for ETFE fluoropolymer (a copolymer of ethylene and tetrafluoroethylene) which is available in tubular form. Tefzel is ten or more times more permeable to helium than to the other gases found in an air atmosphere.

Optimal inside diameters for membrane tubes range from 0.05 to 0.20 inches with membrane wall thicknesses ranging between 0.0005 and 0.0025 inches. In these ranges, internal tube volume is minimized while membrane surface area is maximized without causing turbulent flow, and for most membrane materials the tube is structurally sound for operating under a pressure gradient of one atmosphere (about 15 psi). There is no danger of bursting the ETFE tubing. Hoop stress is pd/2t where d=diameter in inches, t=wall thickness in inches, and p=pressure gradient across the wall in psi. For said tubing, with a wall thickness of 0.001 inch, the hoop stress is only 750 psi. Most plastics have a higher tensile strength, typically 2,000 to 10,000 psi. As for film area, there are 3.77 square inches per foot of tubing. Thus 50 feet of tubing will have 188 square inches, more than a square foot of area.

For membrane tubes in these ranges, 200 square inches or more of tubing material provides excellent sensitivity. A membrane structure having these optimal characteristics can be formed of six sixteen-foot lengths of 0.062 inch internal diameter Tefzel connected in parallel by manifolds 31 and 36 and arranged in five-inch diameter coaxial helixes within a six-inch diameter and six-inch tall separation chamber.

With 0.1 inch diameter tubing all helium atoms are less than 0.05 inch from the wall at all times, and none can get trapped in a cavity; all will move rapidly into and out of the filter. Those which do not penetrate the film will move completely through the filter in three (3) seconds if pumped at a rate of about 0.1 cubic feet per minute (3 liters per minute).

While a preferred embodiment of the present invention has been described in detail, it should be noted by those skilled in the art that various adaptations and modifications can be made which still fall within the scope and spirit of the present invention. In particular, the number of parallel tubes of permeable membrane material may be varied, the geometry with which they are packaged within the separation chamber may be altered, the separation chamber may be packed with a volume displacing inert material to further reduce its internal volume and thus improve the response time, a sample gas heater may be added to increase the rate of diffusion of the tracer gas through the membrane, and other selectively-permeable materials may be used to form the tubular membrane for extracting helium or any of a number of other suitable tracer gases. Accordingly, the scope of the present invention is defined and limited only by the following claims.

What is claimed is:

1. An improved leak detector comprising:
    a portable housing;
    a mass spectrometer, including an evacuation pump, adapted for detecting a tracer gas used to identify leaks, said spectrometer being mounted in said housing;
    a separation chamber mounted to said housing, coupled to said spectrometer, and evacuated by said evacuation pump;
    a probe including a flexible hose extending from said separation chamber for collecting gas samples proximate possible leaks;
    a tubular separation membrane mounted within said separation chamber, one end of the said tubular membrane being connected to receive the sample gas collected by said probe, the other end of said tubular membrane being vented to the atmosphere, said membrane being selectively permeable to permit tracer gas contained in the sample gas being pumped through the tubular membrane to diffuse through the membrane into said separation chamber and be detected by said spectrometer; and
    pump means for pumping sample gas collected by said probe, through said tubular membrane and venting the undiffused portion of the sample.

2. A separation chamber coupled to and for use with a portable mass spectrometer having a gas sampling probe for collecting gas samples at locations proximate a container to detect leakage of a tracer gas from said container, said separation chamber being evacuated by an evacuation pump associated with said spectrometer, said separation chamber comprising:
    chamber means for enclosing a sealed air-tight cavity;
    an inlet duct for receiving sample gas from the gas sampling probe and passing the sample gas into said chamber;
    an outlet duct for passing sample gas out from said chamber;
    a substantially tubular selectively-permeable membrane connected between said inlet duct and said outlet duct, and contained within said chamber for channeling sample gas received from said inlet duct to said outlet duct; said selectively-permeable membrane selectively permitting tracer gas to diffuse therethrough; and
    a spectrometer coupling for channeling tracer gas contained in said chamber external of the tubular membrane to the spectrometer;
    whereby tracer gas is extracted from sample gas collected by the gas sampling probe and is channeled at a high level of vacuum to the mass spectrometer for detection and evacuation and whereby most of the remaining gases of the sample gas are channeled out of the chamber through the outlet duct and are exhausted.

3. The apparatus of claim 1 or 2 wherein said tubular membrane comprises multiple tubes connected in parallel and formed of said selectively-permeable membrane material.

4. The apparatus of claim 3 wherein said separation chamber includes an inlet manifold to connect one end of said tubes to said inlet duct, and an outlet manifold to connect the other end of said tubes to said outlet duct.

5. The apparatus of claim 4 wherein said multiple tubes are connected in parallel by said manifolds and are mounted about a frame such that each tube is arranged in a helix, and the respective helixes are mutually coaxial.

6. The apparatus of claim 3 wherein said tubes are formed of Tefzel and said tracer gas is helium.

7. The apparatus of claim 3 wherein said tubes have a wall thickness between 0.0005 and 0.0025 inches and the apparatus includes means for providing a pressure gradient of approximately 15 psi the tube wall during leak detection.

8. The apparatus of claim 3 wherein the total surface area of the tubular membrane is greater than 100 square inches and the inside diameter of the tube is less than 0.1 inch.

9. The apparatus of claim 3 wherein said tubular membrane includes at least four parallel tubes, each having a length greater than ten feet.

10. The apparatus of claim 1 wherein said tubular membrane comprises multiple tubes of selectively permeable material arranged in helixes of varying diameter and wherein helixes of smaller diameter are positioned such that they are nested within helixes of larger diameter within said chamber.

11. An apparatus as defined in claim 10 wherein each of said helixes forms a substantially cylindrical configuration and wherein the nested helixes are substantially mutually concentric.

12. A sensitive, high-speed leak detector comprising:
a gas separation chamber;
a plurality of small diameter, thin walled plastic tubes mounted in said chamber, said thin walled plastic tubes being selectively permeable to a tracer gas;
means for supplying gas including a tracer gas to said tubes in parallel at a pressure on the order of atmospheric pressure;
means for establishing a high vacuum within said chamber whereby the pressure drop across the walls of said tubes is approximately one atmosphere or about 14 to 15 pounds per square inch; and
means for testing the gas diffused into said separation chamber for said tracer gas.

13. A sensitive, high-speed leak detector as defined in claim 12 wherein said plastic tubes are less than ¼ inch in diameter and have a wall thickness less than 0.03 inch.

14. A sensitive, high-speed leak detector as defined in claim 12 wherein said tracer gas detection means includes means for detecting helium.

15. A sensitive, high-speed leak detector as defined in claim 12 further including means for supporting said thin walled plastic tubes.

* * * * *